United States Patent

Suzuki et al.

[11] Patent Number: 5,936,736
[45] Date of Patent: Aug. 10, 1999

[54] FOCUSING METHOD AND APPARATUS FOR A SURVEYING INSTRUMENT HAVING AN AF FUNCTION, AND ARRANGEMENT OF AN AF BEAM SPLITTING OPTICAL SYSTEM THEREIN

[75] Inventors: Shinichi Suzuki; Yoichi Kojima; Homu Takayama, all of Tokyo, Japan

[73] Assignee: Asahi Seimitsu Kabushiki Kaisha, Tokyo, Japan

[21] Appl. No.: 08/827,389

[22] Filed: Mar. 27, 1997

[30]     Foreign Application Priority Data

Sep. 30, 1996 [JP] Japan ..................................... 8-258481
Oct. 25, 1996 [JP] Japan ..................................... 8-283675

[51] Int. Cl.⁶ ............................ G01B 11/14; G02B 27/40
[52] U.S. Cl. .......................................... 356/375; 250/201.2
[58] Field of Search .............................. 250/201.2, 201.3; 356/375, 4.01; 359/638, 640, 431, 834–836

[56]            References Cited

U.S. PATENT DOCUMENTS

| 4,394,569 | 7/1983 | Nakamura . |
| 4,485,303 | 11/1984 | Suzuki . |
| 4,491,402 | 1/1985 | Suzuki . |
| 5,126,549 | 6/1992 | Yamada et al. ........................ 250/201.2 |
| 5,266,982 | 11/1993 | Soshi . |

FOREIGN PATENT DOCUMENTS 7-159160   6/1995   Japan .

*Primary Examiner*—Robert H. Kim
*Assistant Examiner*—Amanda Merlino
*Attorney, Agent, or Firm*—Greenblum & Bernstein, P.L.C.

[57]              ABSTRACT

In a focusing method for a surveying instrument having a sighting telescope for sighting an object and a distance measuring device for measuring the distance of the object, an automatic focusing function in which the focus state ofthe sighting telescope is detected so that an optical focusing system is automatically focused on the object in accordance with the focus state thus detected, or a distance priority focusing function in which the optical focusing system of the sighting telescope is driven in accordance with the object distance measured by the distance measuring device, is selectively used. The disclosure is also directed to a focusing apparatus and a surveying instrument.

8 Claims, 6 Drawing Sheets

Fig.4
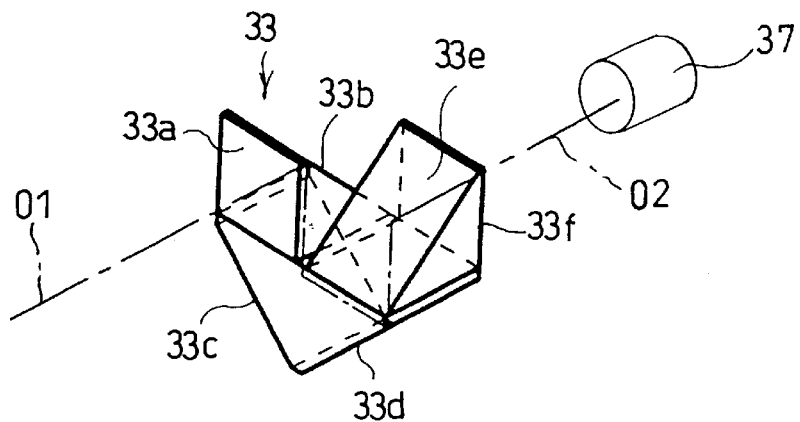
Fig.6
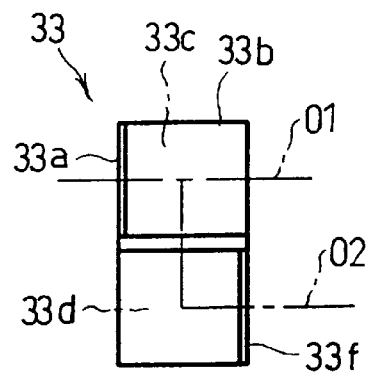
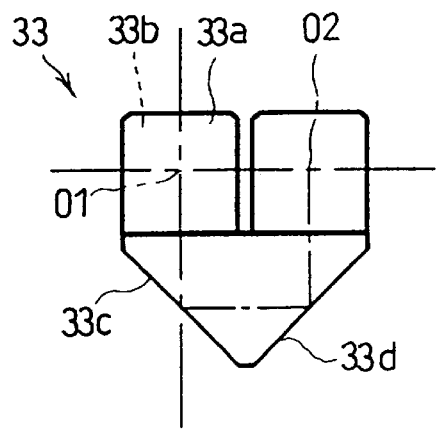
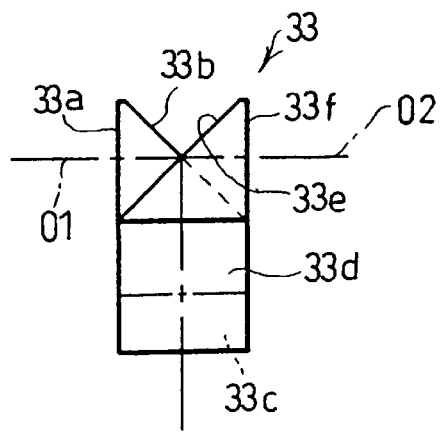
Fig.5          Fig.7

Fig. 14
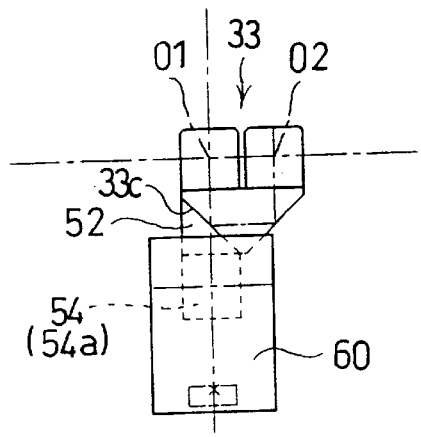
Fig. 15
Fig. 16
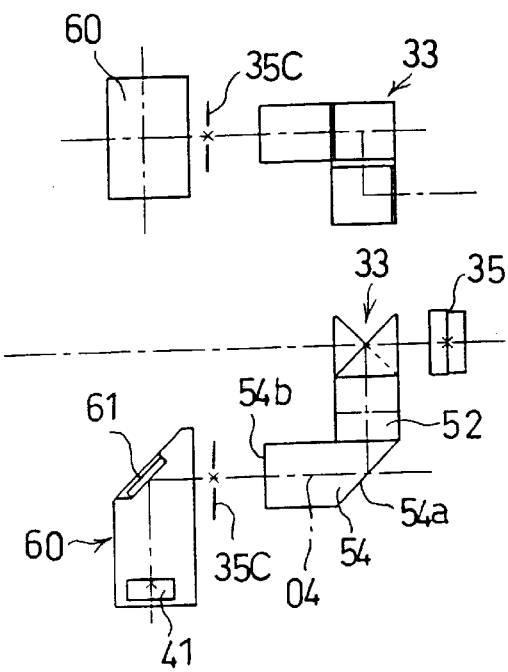
Fig. 17
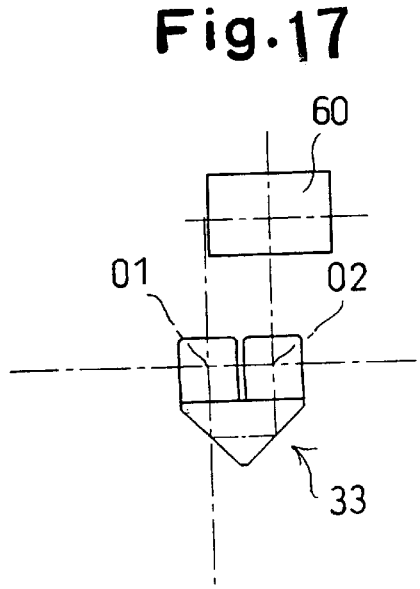
Fig. 18
Fig. 19
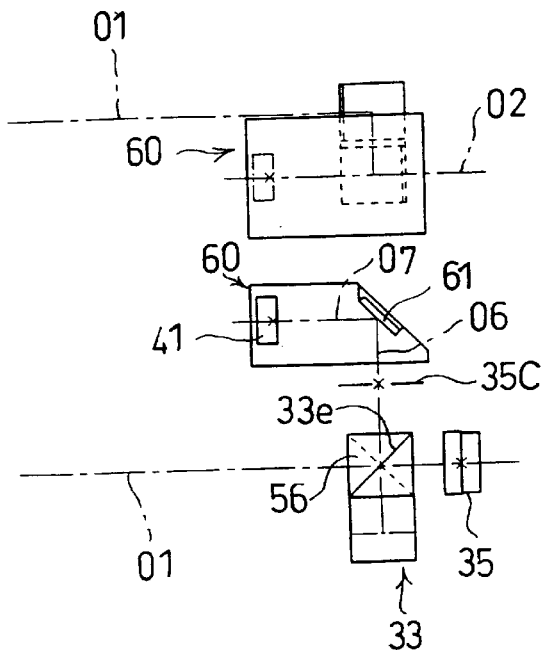

FOCUSING METHOD AND APPARATUS FOR A SURVEYING INSTRUMENT HAVING AN AF FUNCTION, AND ARRANGEMENT OF AN AF BEAM SPLITTING OPTICAL SYSTEM THEREIN

BACKGROUND OF THE INVENTION

1. Field of the Invention

The present invention relates to a focusing method for a surveying instrument having a sighting telescope with an AF (automatic focusing) function, an apparatus for carrying out the focusing method, and an arrangement of an AF beam splitting optical system incorporated therein.

2. Description of the Related Art

In general, a surveying instrument, such as an optical distance measuring meter or a total station, etc., is provided with a sighting telescope which is kept focused on a target (object to be surveyed). During surveying, the sighting telescope is directed at the target, and a focusing knob is subsequently manually rotated to focus the telescope on the target. However, it is difficult for an operator to manually perform a focus adjustment while concentrating on the sighting operation. Moreover, the manual focus adjustment using the focusing knob is time consuming.

To solve these problems, surveying instruments equipped with a sighting telescope having an automatic focusing (AF) function have been recently proposed. In the AF optical system, object light transmitted through a focusing lens of the sighting telescope is made incident upon a surface (plane) conjugate with a focal surface (plane), so that the focus state on the conjugate surface is detected to calculate the amount of defocus (defocus amount) of the focusing lens. Consequently, the focusing lens is moved to an in-focus position in accordance with the calculated defocus amount. The principle of the AF operation is per se known and has been widely used in AF single lens reflex cameras.

While a surveying instrument having an AF function is useful, in practice a number of drawbacks exist. Namely, the AF operation is carried out for the target in a focus area within the field of view of the sighting telescope.

Accordingly, if there is an extraneous object e.g., a fence or leaves swaying in the wind, etc., between the sighting telescope and the target, the target can not be correctly focused or "hunting" occurs. Moreover, in a conventional surveying instrument having an AF function, the light path of the sighting optical system is split to produce a focus detecting beam which is detected by an AF sensor provided in the split light path, thus resulting in an increase in the size of the surveying instrument.

SUMMARY OF THE INVENTION

The primary object of the present invention is to provide a focusing method and apparatus for a surveying instrument in which the focusing operation can be certainly carried out for the target even if there is an extraneous object between the target and the sighting telescope without deterioration in the convenience of the AF function.

Another object of the present invention is to provide a compact surveying instrument having a sighting telescope with an AF function.

According to the basic concept of the present invention, the focusing function based on object distance data (referred to as a distance priority focusing function) and the automatic focusing function are selectively used so as to provide a more convenient or useful focusing operation, in view of the fact that a surveying instrument such as a total station or an optical distance meter, etc., has an extremely precise distance measuring function.

To this end, according to an aspect of the present invention, there is provided a focusing method for a surveying instrument having a sighting telescope for sighting an object and a distance meter for measuring a distance of the object, having an automatic focusing function in which a focus state of the sighting telescope is detected so that an optical focusing system of the sighting telescope is automatically focused on the object in accordance with the focus state thus detected. A distance priority focusing function is also provided in which the optical focusing system of the sighting telescope is driven in accordance with the object distance measured by the distance meter. The automatic focusing function and the distance priority focusing function are selectively used.

According to another aspect of the present invention, there is provided a focusing apparatus for a surveying instrument having a sighting telescope for sighting an object, and a distance measuring device for measuring the distance of the object, having an automatic focusing function in which a focus state of the sighting telescope is detected so that an optical focusing system of the sighting telescope is automatically focused on the object in accordance with the focus state thus detected. A distance priority focusing function is also provided in which the optical focusing system of the sighting telescope is driven in accordance with the object distance measured by the distance measuring device, together with a focus mode selecting device for selecting the automatic focusing function or the distance priority focusing function.

The distance measuring device can include an optical distance meter so that the automatic focusing function or the distance priority focusing function can be selected in accordance with the presence or absence of light reflected from the object and received by the optical distance meter.

In another aspect of the present invention, when the optical distance meter does not receive light reflected from the object, the focusing range defined by the automatic focusing function is restricted to a narrow limit including a focus corresponding to distance data obtained immediately after no receipt of the reflected light by the optical distance meter takes place, in accordance with the distance data.

In the case that the surveying instrument includes an angle measuring function and a memory function to store angle data obtained by the angle measuring function, the automatic focusing function can be switched to the distance priority focusing function at a specific angle position.

In practice, it is preferable that a manual focusing function be provided, in which the focusing operation can be manually carried out.

It is possible to provide a focal distance input device, so that focusing can be effected in accordance with an object distance input by the focal distance input device. The focal distance can be input, for example, using a keyboard or from a communication terminal to move the optical focusing system in accordance with the focal distance.

The sighting telescope can include of an objective lens, a dichroic prism through which visible light can be transmitted, a focusing lens system, an optical image erecting system, a beam splitting system, a focusing plate, and an eyepiece system, arranged in this order from the object side. The optical distance meter can be provided with a light emitter which emits distance measuring light and a light receiver which receives the distance measuring light reflected by the object. Consequently, the distance measuring light emitted from the light emitter is reflected by the dichroic prism, transmitted through the objective lens, reflected by the object, transmitted through the objective lens, reflected by the dichroic prism, and reflected by a mirror, before being made incident upon the light receiver.

It is possible to provide a focus detecting sensor in a light path of light split by the beam splitter to detect a focus state on a surface conjugate with the focusing plate. Thus, the displacement of the focusing lens necessary to focus on the conjugate surface can be determined in accordance with the output of the focus detecting sensor.

The present invention also provides an AF optical beam splitting system which contributes to a reduction of the size of a surveying instrument in which the AF optical beam splitting system is to be incorporated.

To this end, according to another aspect of the present invention, a surveying instrument with an AF function has a sighting telescope which included an objective lens, a focusing lens system, a Porro prism which constitutes an optical image erecting system, a focusing plate, and an eyepiece system, in this order from the object side. A beam splitting system is applied to a semi-transparent surface which is constituted by one of the reflecting surfaces of the Porro prism. A front reflection element reflects the light split by the optical beam splitting system in a direction substantially parallel with the optical axis of the sighting telescope toward the front of the Porro prism. An AF sensor is provided in the portion of the light path located behind the front reflection element to detect the focus state on a surface conjugate with the focusing plate. A focusing lens driving device drives the focusing lens system in accordance with the output of the AF sensor.

The AF sensor can be incorporated in an AF sensor unit integral with a reflection mirror which reflects light incident thereupon toward the AF sensor.

The front reflection element can be made of either the reflection mirror incorporated in the AF sensor unit or a reflection element other than the reflection mirror incorporated in the AF sensor unit.

If the beam splitting system is adhered to a second or fourth reflection surface of the four reflection surfaces of the Porro prism, the AF optical beam splitting system can be made smaller and simpler.

In another aspect of the present invention, the surveying instrument further includes a distance measuring device for measuring the distance of an object. A distance priority focusing function is provided in which the focusing lens of the sighting telescope is driven in accordance with the object distance measured by the distance measuring device. A focus mode selecting device selects the distance priority focusing function or the AF function which is controlled in accordance with the output of the AF sensor.

According to still another aspect of the present invention, a surveying instrument with an AF function has a sighting telescope which is comprised of an objective lens, a focusing lens system, a Porro prism which constitutes an image erecting system, a focusing plate, and an eyepiece system, in this order from the object side. A beam splitter is attached to a semi-transparent surface which is constituted by a second or fourth reflection surfaces of the Porro prism. An AF sensor is provided in the light path of light split by the beam splitter to detect the focus state on a surface conjugate with the focusing plate. A focusing lens driver drives the focusing lens system in accordance with the output of the AF sensor.

The present disclosure relates to subject matter contained in Japanese Patent Application Nos. 8-258481 (filed on Sep. 30, 1996) and 8-283675 (filed on Oct. 25, 1996) which are expressly incorporated herein by reference in their entireties.

BRIEF DESCRIPTION OF THE DRAWINGS

The invention will be described below in detail with reference to the accompanying drawings, in which:

FIG. 4 is a perspective view of a Porro prism in the surveying instrument shown in FIG. 3;

FIG. 5 is a front elevational view of the Porro prism shown in FIG. 4;

FIG. 6 is a plan view of the Porro prism shown in FIG. 4;

FIG. 7 is a side elevational view of the Porro prism shown in FIG. 4;

FIG. 14 is a front elevational view of an AF optical beam splitting system according to a fourth embodiment of the present invention;

FIG. 15 is a plan view of the AF optical beam splitting system shown in FIG. 14;

FIG. 16 is a side elevational view of the AF optical beam splitting system shown in FIG. 14;

FIG. 17 is a front elevational view of an AF optical beam splitting system according to a fifth embodiment of the present invention;

FIG. 18 is a plan view of the AF optical beam splitting system shown in FIG. 17; and, FIG. 19 is a side elevational view of the AF optical beam splitting system shown in FIG. 17.

DESCRIPTION OF THE PREFERRED EMBODIMENTS

Figure 1:
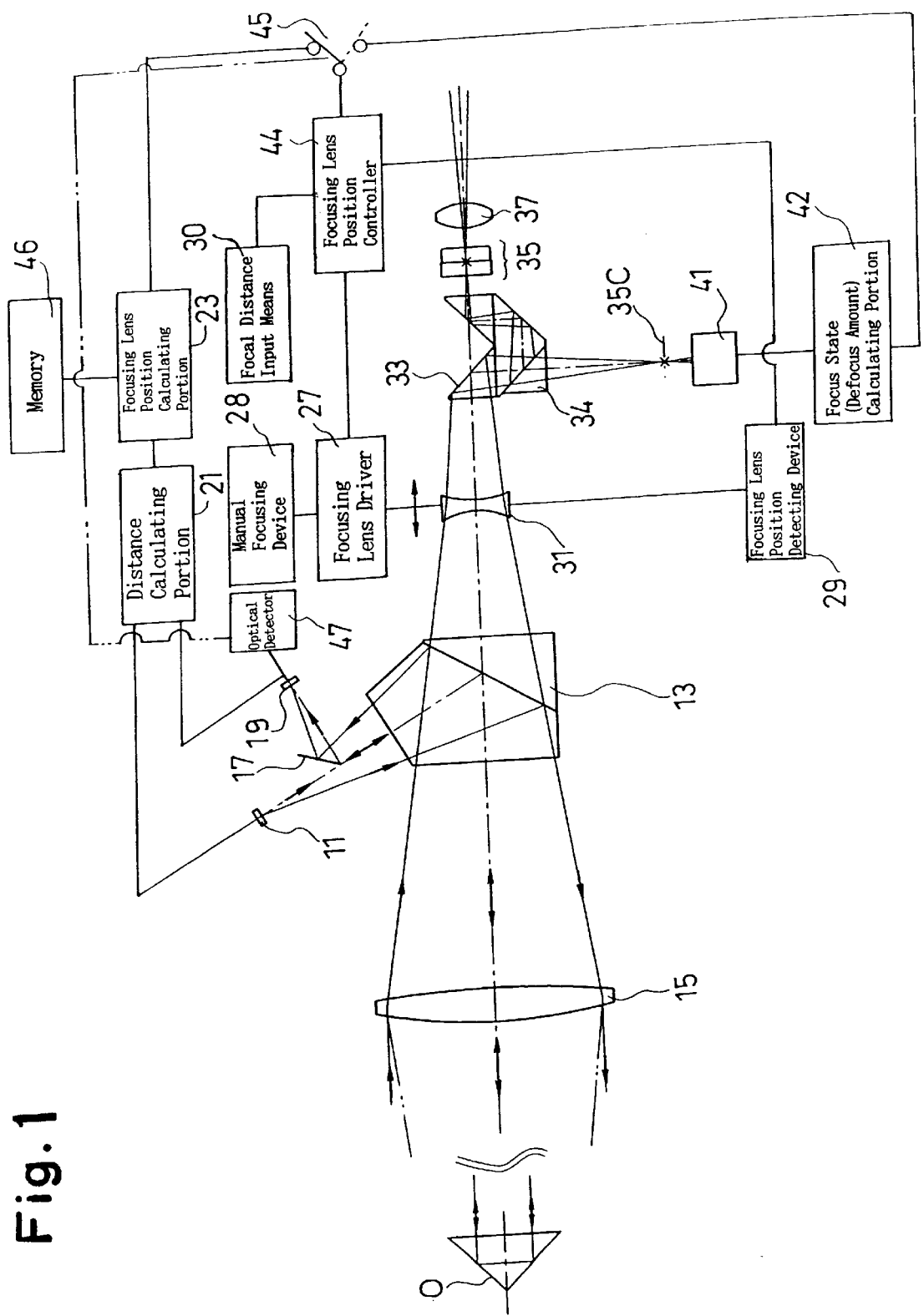
FIG. 1 is a block diagram of a surveying instrument to which the present invention is applied, showing the light paths thereof.
Figure 2:
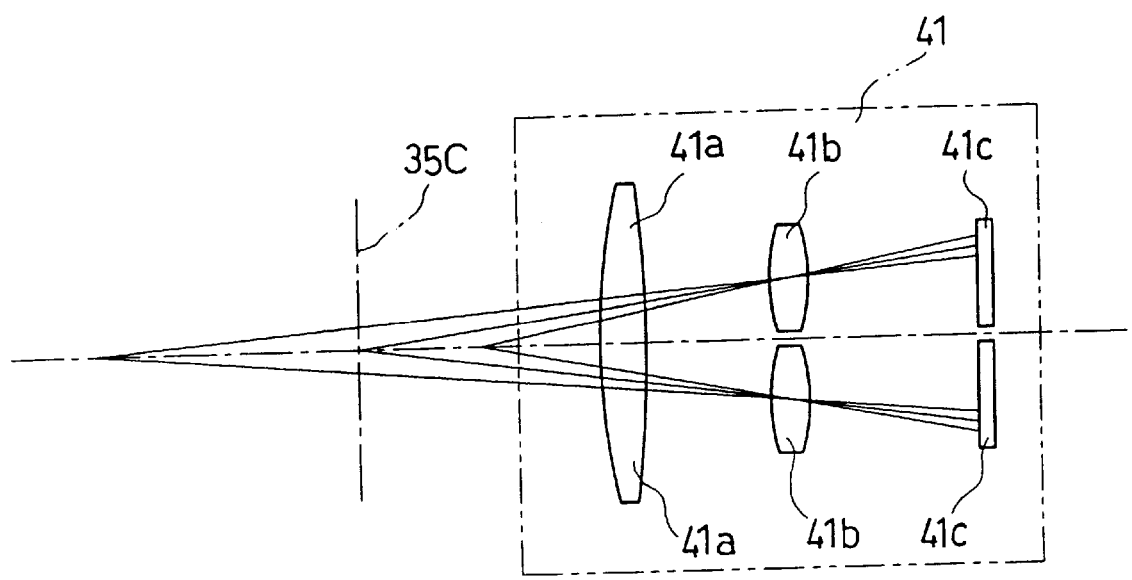
FIG. 2 is a schematic view of an AF sensor shown in FIG. 1.

FIGS. 1 and 2 show the principle of the focusing method and apparatus for a surveying instrument according to the present invention.

The surveying instrument (a total station or an optical distance meter) shown in FIG. 1 includes an optical distance measuring meter (electronic distance meter) and a sighting telescope. The optical distance measuring meter includes a light emitter 11 which emits distance measuring light, a dichroic prism 13 which reflects the distance measuring light, and an objective lens 15 which serves not only as a light emitting lens for emitting the distance measuring light toward a target O (object to be measured) but also as a light receiving lens for receiving the distance measuring light reflected by the object O (e.g., corner cube prism). Namely, the distance measuring light reflected by the object O is incident upon the objective lens 15 and the dichroic prism 13. The light reflected by the prism 13 is then incident upon a mirror 17 which reflects the distance measuring light toward a light receiver 19 and a distance calculating device (portion) 21. The device 21 controls the light emitter 11 and the light receiver 19 and detects the distance value.

The light emitter 11 is comprised of light emitting diodes or laser diodes serving as a distance measuring beam emitting means or system, and a light emitter unit which includes an optical system provided with the light emitting elements incorporated therein, etc. The dichroic prism 13 reflects the distance measuring light but permits natural light (visible light) to pass therethrough. Generally to achieve this end, light other than visible light, such as infrared radiation, is used as the distance measuring light. Note that the corner cube prism O can be replaced by a mirror. In the case of a non-prism (non-corner cube prism) type optical distance meter reflection at the surface of the target is employed.

The distance calculating device 21 calculates the distance of the object based on the distance measuring light (internal reference light) emitted from the light emitter 11 and the distance measuring light received by the light receiver 19, in accordance with a predetermined algorithm using a phase difference measuring method or an optical radar method, etc. The object distance thus obtained is indicated on a display panel (not shown), etc. A focusing lens position calculating device 23 calculates the displacement of the focusing lens 31 necessary to focus on the object located at the object distance, in accordance with the object distance calculated by the distance calculating device 21.

The sighting telescope includes the objective lens 15, the dichroic prism 13, the focusing lens 31, an erecting prism (Porro prism) 33, a beam splitting prism (optical light path splitting system) 34, a focusing plate 35, and an eyepiece 37, in this order from an object side (the left side in FIG. 1). The sighting telescope and the optical distance measuring meter are integrally incorporated in the body of the surveying instrument which is attached to a base so as to adjust the azimuth and the elevation and depression angles with respect to the vertical and horizontal axes.

The object light (visible light) incident upon the objective lens 15 is transmitted through the dichroic prism 13, and is converged onto the focusing plate 35, or in the vicinity thereof, to form an erect image through the focusing lens 31 and the erection prism 33. The operator can view the image, which is enlarged, through the eyepiece 37. The focusing plate 35 is provided with marks, including a reference mark to which the distance measuring light can be made incident and other marks (cross, reticle , etc.) necessary for surveying. The operator views the object image and the reference mark, etc., and adjusts the azimuth and the elevation and depression angles of the sighting telescope so that the object image overlaps the reference mark, that is, the distance measuring light is incident upon the object to be surveyed.

An AF sensor (focus detecting sensor) 41 is provided in the light path split by the beam splitting prism 34 to detect the focus state (defocus amount) at the conjugate surface 35C conjugate with the focal surface 35. As is well known, the AF sensor 41 supplies the light signal received by the line sensor located near the conjugate surface 35C to the focus state (defocus amount) calculating device 42. FIG. 2 shows the principle of calculating the defocus amount by way of example. As shown in FIG. 2, a condenser lens 41a, a pair of separator lenses 41b, and a pair of line sensors 41c such as CCDs positioned behind the respective separator lenses 41b, are provided behind the conjugate surface 35C.

The incident points of the object image on the line sensors 41c differ depending on the focus state, i.e., when the image of the target (object image) is formed correctly on the conjugate surface 35C (focused state), when the image is formed in front of the conjugate surface 35C (front focus), or when the image is formed behind the conjugate surface 35C (rear focus). The defocus amount can be judged in accordance with the position of the object image on the line sensors 41c. The focus state calculating device 42 which receives the outputs of the line sensors 41c amplifies the outputs through an amplifier (not shown) and carries out the calculation through a calculating circuit (not shown) to detect the focus state, i.e., "focused state", "defocused state", "front focus state", or "rear focus state". Consequently, the defocus amount at the conjugate surface 35C and the displacement of the focusing lens 31 necessary to obtain the focused state can be detected.

One of the displacement values (position data) from the focusing lens 31 obtained by the focusing lens position calculating portion 23 and the focus state calculating portion 42 is sent to the focusing lens position controller 44 through a focus mode selection switch 45. The position controller 44 actuates a focusing lens driver 27 having a motor or the like, in accordance with one of the outputs of the focusing lens position calculating portion 23 and the focus state calculating portion 42 and the position data of the focusing lens 31 detected by a focusing lens position detector 29 to thereby move the focusing lens 31 to an in-focus position.

Therefore, the movement of the focusing lens 31 is controlled in the automatic focus mode and in the distance priority focus mode when the focus state (defocus amount) calculating portion 42 is connected to the focusing lens position controller 44, and the focusing lens position calculating portion 23 is connected to the focusing lens position controller 44, in accordance with the operation of the focus mode selection switch 45, respectively. It is possible to drive the focusing lens driver 27 by the manual focusing device 28 to thereby move the focusing lens 31 to an optional position. Alternatively, it is also possible to input a specific focal distance value through a focal distance input means 30 so that the focusing lens 31 is moved through the focusing lens position controller 44 in accordance with the input object distance value. Furthermore, it is possible to input the position data (coordinate value) of the surveying instrument and the position data (coordinate value) of the target, so that the object distance can be calculated in accordance with the coordinate values. Thus, the focusing lens 31 is moved to an in-focus position corresponding to the calculated object distance through the focusing lens position controller 44. The focal distance input means 30 can be realized for example by a keyboard, or data stored in and read from memories, or communication data, etc.

The operator can manually change the focus mode by the focus mode selection switch 45. For instance, the focus modes can be changed as follows:

1) The automatic focus mode is selected when the light receiver 19 of the optical distance measuring meter does not receive the light reflected from the object. When a light receipting detector 47 detects that the light receiver 19 has received the reflected light, the mode is switched to the distance priority focus mode. The reception of the reflected light by the light receiver 19 means that the sighting telescope is correctly collimated with respect to the aiming object, and hence, once the focus meets the object distance, the sighting telescope can be kept in a focused state even if an extraneous object is located between the object and the surveying instrument.

2) In the case that the surveying instrument is a total station having an angle measuring function and a angle data storing function, the automatic focus mode is switched to the distance priority focus mode at a specific angle position. For instance, in a reference point survey or the like, in which a plurality of sighting and measuring operations take place for the same objects, the focusing operation must be carried out for each collimating and measuring operation. In such measurements, the angle data and the position data obtained when the first focusing operation is completed are stored in the memories. The distance priority focus mode is selected at the specific angle position, so that the focal position can be obtained in accordance with the object distance data.

When the state of the sighting telescope is changed from a first state in which the light receiver 19 receives the distance measuring light (light receiving state), to a second state in which no light is received by the light receiver 19 during the surveying operation (light non-receiving state), it can be assumed that the object (e.g., the corner cube prism O) moves. The basis for this assumption is that it is likely that a slight movement of the object has occurred. Therefore, if the focus control coverage by the automatic focusing function is restricted, under software control of the focus lens position controller 44, which receives object distance data from the distance calculating portion 21, to a narrow range including a focus corresponding to the distance data obtained immediately after the light receiver 19 receives no distance measuring light, i.e., immediately when the light receiver 19 changes to the light non-receiving state, the subsequent automatic focusing operation can be quickly effected in accordance with the distance data obtained immediately after the distance measuring light is not received by the light receiver 19.

The relationship between the object distance and the position of the focusing lens 31 which is focused on the object at the object distance, wherein the image of the object at the object distance is formed on the focusing plate 35 is explained as follows by way of example. The relationship which is predetermined by calculation in accordance with numerical values of optical parameters on design, or is obtained in advance by actual measurements of the object, is split into a number of zones and stored in a memory means (ROM, etc.) as table data. The distance calculating device 21 determines the position (movement) of the focusing lens 31 in accordance with the distance data with reference to the table. It is possible to store a formula which represents the relationship between the distance data and the corresponding focal position of the focusing lens 31, in a memory such as a ROM, so that the lens position can be determined using the formula upon measurement.

The focusing lens position detector 29 which detects the position of the focusing lens 31 can be realized either by an absolute position detecting means, in which the lens position is detected by a code plate which extends in the direction of the movement of the focusing lens 31 and a reader which reads a position code formed on the code plate; or by a relative position detecting means in which the movement of the focusing lens 31 from a reference position is detected by counting the number of revolutions of the motor of the focusing lens driver 27. Alternatively, it is possible to detect the position of the focusing lens 31 by two steps, i.e., a rough detection by the absolute position detecting means and a fine detection by the relative position detecting means.

Figure 3:
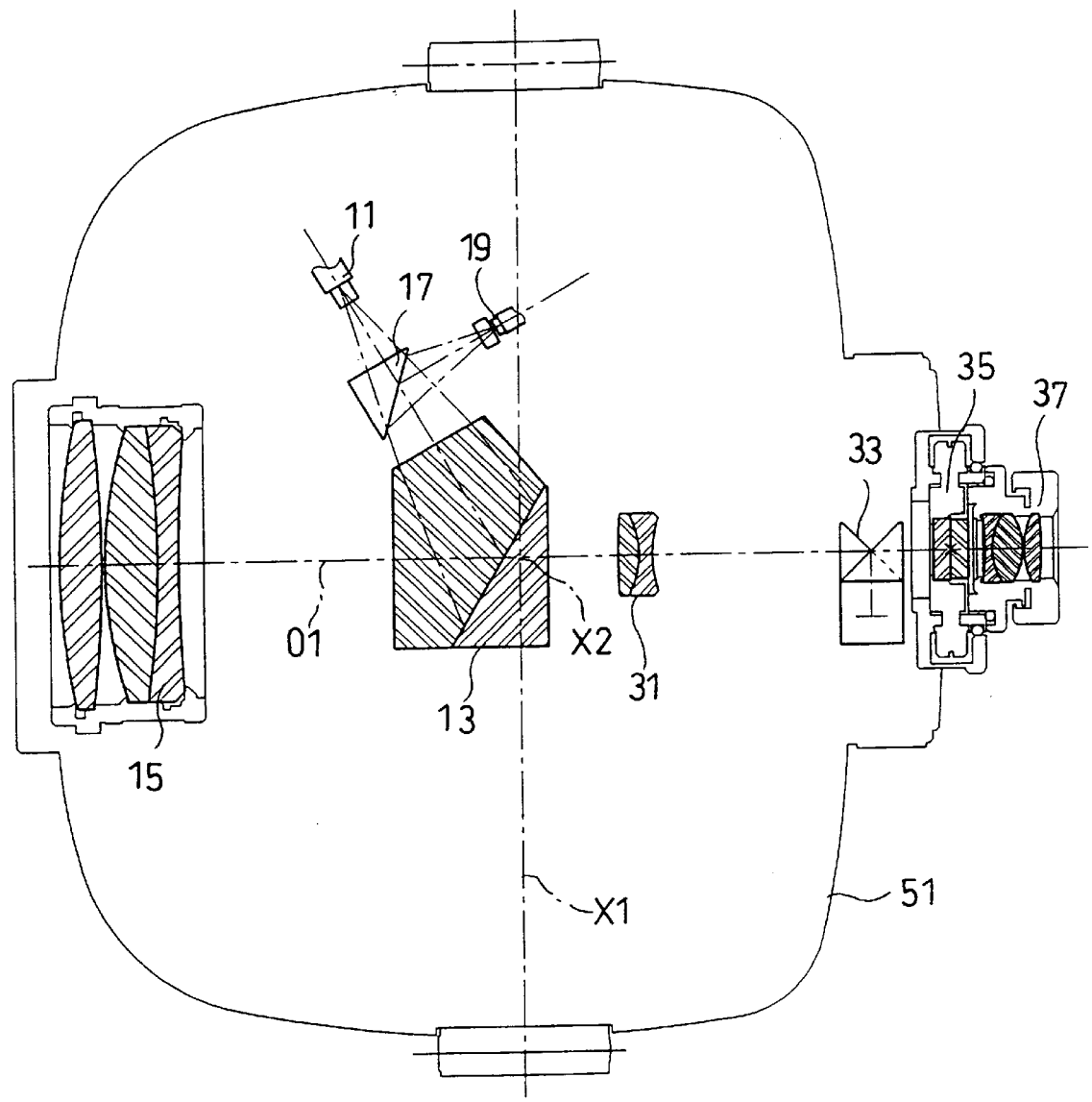
FIG. 3 is a side sectional view of a surveying instrument to which the present invention is applied.

FIG. 3 shows an embodiment of an internal structure of the surveying instrument (total station) to which the present invention is applied. The AF splitting optical system (prism 34) is not shown in FIG. 3. The objective lens 15, the dichroic prism 13, the focusing lens 31 and the Porro prism 33 are provided on an optical axis O1 of the sighting telescope. As can be seen in FIGS. 4 through 7, the Porro prism 33 is provided with a first incident surface 33a perpendicular to the optical axis O1, a first reflection surface 33b which reflects the light incident upon the first incident surface 33a in a downward direction, a second reflection surface 33c which reflects the light reflected by the first reflection surface 33b in a lateral direction (perpendicular to the optical axis O1 without intersecting the same), a third reflection surface 33d which reflects the light reflected by the second reflection surface 33c in an upward direction, a fourth reflection surface 33e which reflects the light reflected by the third reflection surface 33d in a direction (optical axis O2) parallel to the optical axis O1, and an emission surface 33f normal to the optical axis O2. The eyepiece 37 is provided on the optical axis O2.

The elements mentioned above and those shown in FIG. 1 are accommodated in a housing 51 which can rotate in a horizontal plane about the vertical axis X1 normal to the optical axis O1, and in a vertical plane about the horizontal axis X2 which passes through the intersection point of the optical axis O1 and the vertical axis X1 and which is perpendicular to the sheet of the drawing (FIG. 3).

The basic concept of the AF optical beam splitting system according to the present invention resides in that one of the four reflection surfaces 33b, 33c, 33d, 33e of the Porro prism 33 is a semi-transparent surface to which a beam splitting prism (beam splitter) is cemented, that the light split by the beam splitter is reflected by a front reflection element in the forward direction parallel to the optical axis O1 from the Porro prism 33, and that the AF sensor is provided in the light path behind the front reflection element. With this arrangement in which the AF light split by the Porro prism 33 is emitted from the Porro prism in the forward direction, the inner space of the housing 51 can be effectively utilized, thus resulting in a reduction of the size of the housing 51.

Figure 8:
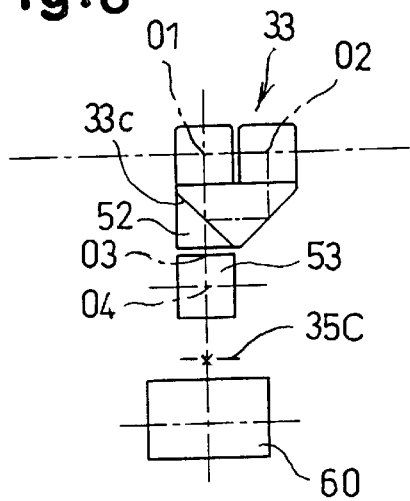
FIG. 8 is a front elevational view of an AF optical beam splitting system according to a first embodiment of the present invention.
Figure 9:
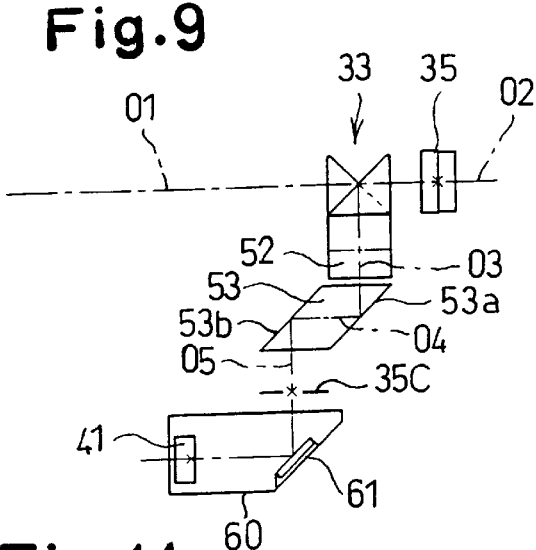
FIG. 9 is a side elevational view of the AF optical beam splitting system shown in FIG. 8.

FIGS. 8 through 19 show different embodiments of the AF optical beam splitting system. FIGS. 8 and 9 show a first embodiment thereof. In the first embodiment, the second reflection surface 33c of the Porro prism 33 is a semi-transparent surface to which the beam splitting prism 52 is adhered. The optical axis O3 of the light split by the beam splitter 52 is perpendicular to the optical axis O1. A front reflection prism 53 serving as a front reflection element is provided on the optical axis O3. The front reflection prism 53 is provided with a first reflection surface (front reflection surface) 53a which reflects the light travelling along the optical axis O3 at right angles in a forward direction (optical axis O4), and a second reflection surface 53b which is parallel with the first reflection surface 53a, and which reflects the light reflected by the first reflection surface 53a at right angles in a downward direction (optical axis O5). The focusing plate 35C is provided on the optical axis O5. The AF sensor unit 60 is provided behind the focusing plate 35C. The AF sensor unit 60 is comprised of a reflection mirror 61 and an AF sensor 41 similar to that shown in FIG. 2. The AF sensor 41 detects the focus state on the focusing plate 35C.

Figure 10:
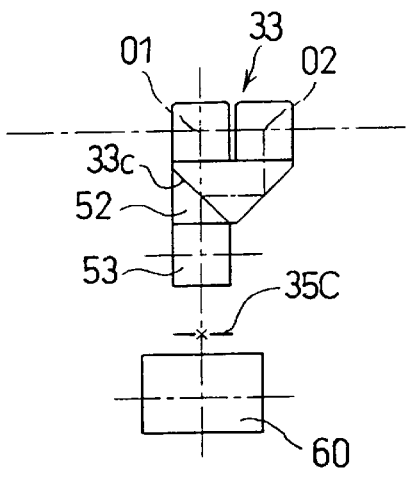
FIG. 10 is a front elevational view of an AF optical beam splitting system according to a second embodiment of the present invention.
Figure 11:
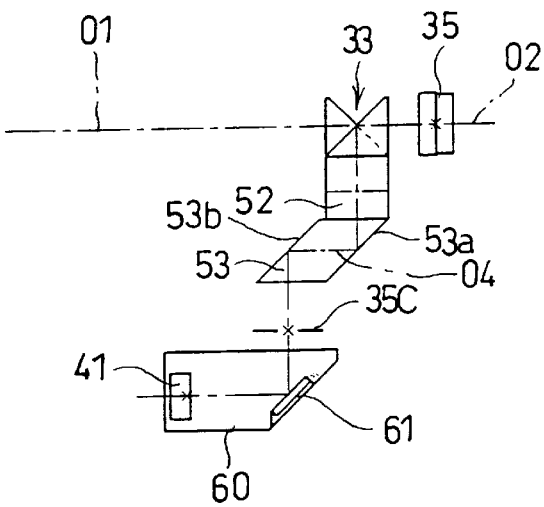
FIG. 11 is a side elevational view of the AF optical beam splitting system shown in FIG. 10.

FIGS. 10 and 11 show a second embodiment of the AF optical beam splitting system. In the second embodiment, the beam splitting prism 52, which is spaced from the front reflection prism 53 in the first embodiment, is fixed (adhered) to the front reflection prism 53. The remaining structure of the second embodiment is the same as that of the first embodiment.

Figure 12:
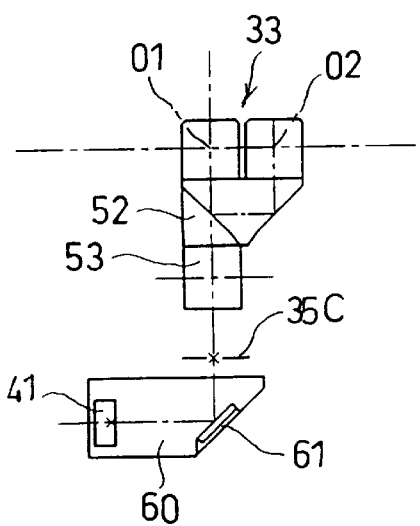
FIG. 12 is a front elevational view of an AF optical beam splitting system according to a third embodiment of the present invention.
Figure 13:
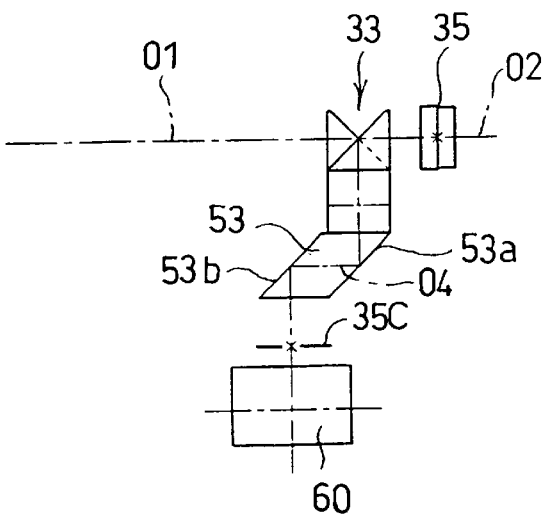
FIG. 13 is a side elevational view of the AF optical beam splitting system shown in FIG. 12.

FIGS. 12 and 13 show a third embodiment of the AF optical beam splitting system. In the third embodiment, the direction of the AF sensor unit 60 is different from that of the AF sensor unit in the second embodiment. Namely, the AF sensor unit 60 of the third embodiment is rotated about the intersection point of the reflection mirror 61 and the optical axis of the light incident upon the reflection mirror 61 in connection with the AF sensor unit 60 of the second embodiment, while being optically equivalent to the AF sensor unit of the second embodiment. In the first and second embodiments, the optical path from the reflection mirror 61 to the AF sensor 41 is parallel to the optical axis O1, whereas in the third embodiment, the optical path from the reflection mirror 61 to the AF sensor 41 extends in a lateral direction perpendicular to the optical axis O1 or O2 without intersecting the same.

FIGS. 14 through 16 show a fourth embodiment of the AF optical beam splitting system, in which the front reflection prism 53 in the second embodiment is replaced by a front reflection prism 54, and in which the direction of the AF sensor unit 60 is different from that in the second embodiment. The front reflection prism 54 is provided with a first reflection surface 54a similar to the first reflection surface 53a of the front reflection prism 53, and a second reflection surface 54b perpendicular to the optical axis O4 of the light reflected by the first reflection surface 54a. The reflection mirror 61 of the AF sensor unit 60 is located on the front optical axis O4. The direction of the AF sensor unit 60 can be optionally set as mentioned above.

FIGS. 17 through 19 show a fifth embodiment of the AF optical beam splitting system, in which the fourth reflection surface 33e of the Porro prism 33 is made of a semi-transparent surface to which the beam splitting prism 56 is cemented. The optical axis O6 of the light split by the beam splitter 56 is perpendicular to the optical axis O1. The AF sensor unit 60 is provided on the optical axis O6. In the fifth embodiment, the direction of the AF sensor unit 60 is set such that the optical axis O7 of the light travelling from the reflection mirror 61 of the AF sensor unit 60 to the AF sensor 41 defines a front reflection light path parallel with the optical axis O1.

In theory, the optical prism 52 or 56 can be adhered to one of the first through fourth reflection surfaces 33b through 33e which is made of a semi-transparent surface. However, it is preferable that the beam splitting prism 52 or 56 be adhered to the second reflection surface 33c or the fourth reflection surface 33e of the Porro prism 33 to simplify the AF optical beam splitting system as in the above-mentioned embodiments.

The AF beam splitting system shown in FIGS. 8 through 19 can be generally applied to an optical beam splitter in a surveying instrument having an AF function but without the focusing method or apparatus described above with reference to FIGS. 1 and 2.

As can be understood from the above discussion, according to the present invention, since the focusing method or the focusing apparatus has an automatic focusing function in which the focus state of the sighting telescope is detected to focus the optical focusing system on the object, and a distance priority focusing function in which the optical focusing system of the sighting telescope is driven in accordance with the object distance measured by the distance measuring means, wherein the automatic focusing function (automatic focusing mode) and the distance priority focusing function (distance priority focusing mode) can be selectively used, focusing on the object can be certainly achieved even if there is an extraneous object between the sighting telescope and the aiming object without sacrificing the advantages expected from the automatic focusing function.

Moreover, according to the present invention, in a surveying instrument having an AF function incorporated therein, since the AF beam splitting system can be made of a Porro prism as an optical image erection system, the AF beam splitting system can be made small, thus resulting in a compact surveying instrument.

What is claimed is:

1. A surveying instrument having an autofocus system, said surveying instrument comprising:
   a sighting telescope having, in order from an objective side, an objective lens, a focusing lens system, a Porro prism for erecting an optical image and having, in order from a light receiving side thereof, first, second, third, and fourth reflecting surfaces, a focusing plate, and an eyepiece system,
      wherein said Porro prism displaces light entering said Porro prism so that objective imaging light exiting said Porro prism is displaced in only one orthogonal direction from said objective imaging light entering said Porro prism;
   a beam splitting system applied to a semi-transparent surface, said semi-transparent surface being one of said second reflecting surface and said fourth reflecting surface of said Porro prism, light split by said beam splitting system exiting said beam splitting system in a different orthogonal direction from said only one orthogonal direction;
   a front reflection element that reflects said light split by said beam splitting system, in a forward direction substantially parallel to an optical axis of said sighting telescope, and opposite to the direction of said objective imaging light entering the Porro prism along the optical axis;
   an autofocus sensor provided in a light path extending from said front reflection element in said forward direction to detect a focus state on a surface conjugate with said focusing plate; and
   a focusing lens driving device that drives said focusing lens system in accordance with an output of said autofocus sensor.

2. The surveying instrument according to claim 1, wherein
   said autofocus sensor is incorporated in an autofocus sensor unit integral with a reflection mirror, said reflection mirror reflecting light incident thereupon toward said sensor unit.

3. The surveying instrument according to claim 2, wherein
   said front reflection element comprises said reflection mirror.

4. The surveying instrument according to claim 2, wherein
   said reflection mirror is provided separately from said front reflection element.

5. The surveying instrument according to claim 1, further comprising:
   a distance measuring device that measures an object distance of said object; and a distance priority focusing system that drives said focusing lens system of said sighting telescope in accordance with said object distance measured by said distance measuring device; and a focus mode selecting device, controlled in accordance with an output of said autofocus sensor, that selectively operates one of said distance priority focusing system and said autofocus system.

6. The surveying instrument according to claim 1, wherein light passing through said sighting telescope is non-parallel between said objective lens and said eyepiece, and when said beam splitting system is applied to said second reflecting surface, said front reflection element comprises a prism for positioning said surface conjugate with said focusing plate between said beam splitter and said focusing sensor.

7. The surveying instrument according to claim 6, wherein when said beam splitting system is applied to said second reflecting surface, said front reflection element comprises a rhomboid prism for positioning said surface conjugate with said focusing plate between said beam splitter and said focusing sensor.

8. A surveying instrument having an autofocus system, said surveying instrument comprising:

a sighting telescope comprising, in order from an objective side, a focusing lens system, a Porro prism image erecting system having first, second, third, and fourth reflecting surfaces, a focusing plate, and an eyepiece system, wherein said Porro prism displaces objective imaging light entering said Porro prism so that objective imaging light exiting said Porro prism is displaced in only one orthogonal direction from said objective imaging light entering said Porro prism;

a beam splitter attached to one of said second and fourth reflecting surfaces of said Porro prism image erecting system, said one of said second and fourth reflecting surfaces being a semi-transparent reflecting surface;

an autofocus sensor provided in a light path split by said beam splitter, said autofocus sensor detecting a focus state of said sighting telescope on a surface optically conjugate with said focusing plate; and a focusing lens driver that drives said focusing lens system in accordance with an output of said autofocus sensor.

* * * * *